US 9,194,175 B2
United States Patent
Lemonds

(10) Patent No.: US 9,194,175 B2
(45) Date of Patent: Nov. 24, 2015

(54) INTERCHANGEABLE BREECH LOCK FOR GLOVE BOXES

(71) Applicant: Savannah River Nuclear Solutions, LLC, Aiken, SC (US)

(72) Inventor: David Preston Lemonds, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 54 days.

(21) Appl. No.: 13/946,463

(22) Filed: Jul. 19, 2013

(65) Prior Publication Data

US 2015/0022065 A1    Jan. 22, 2015

(51) Int. Cl.
*A61G 11/00* (2006.01)
*E06B 7/28* (2006.01)
*B25J 21/02* (2006.01)
*E05C 3/04* (2006.01)
*E05C 7/00* (2006.01)

(52) U.S. Cl.
CPC . *E06B 7/28* (2013.01); *B25J 21/02* (2013.01); *E05C 3/043* (2013.01); *E05C 7/002* (2013.01)

(58) Field of Classification Search
CPC .......... E05B 65/001; E05B 9/02; B25J 21/02; B25J 21/00; B25J 21/005
USPC ............................................................ 312/1
See application file for complete search history.

(56) References Cited

U.S. PATENT DOCUMENTS

| 3,776,284 | A | * | 12/1973 | Guyer et al. ................ 141/65 |
| 3,907,389 | A | | 9/1975 | Cox et al. |
| 4,059,903 | A | * | 11/1977 | Piet et al. ................... 312/1 |
| 4,089,571 | A | | 5/1978 | Landy |
| 4,668,153 | A | | 5/1987 | Sperinck et al. |
| 4,893,022 | A | | 1/1990 | Hall et al. |
| 5,061,858 | A | | 10/1991 | Mallory |
| 5,141,125 | A | | 8/1992 | Canty et al. |
| 5,170,027 | A | | 12/1992 | Brodersen |
| 5,460,439 | A | * | 10/1995 | Jennrich et al. ............. 312/1 |
| 5,857,308 | A | | 1/1999 | Dismore et al. |
| 6,152,512 | A | | 11/2000 | Brown et al. |
| 6,851,769 | B2 | | 2/2005 | Hauville |
| 8,318,091 | B2 | | 11/2012 | Py |
| 8,328,042 | B2 | * | 12/2012 | Canty et al. .............. 220/663 |
| 2005/0217102 | A1 | * | 10/2005 | Glachet et al. ............ 29/454 |

(Continued)

FOREIGN PATENT DOCUMENTS

| DE | 2 424 791 | 12/1975 |
| GB | 2 218 663 | 11/1989 |
| WO | WO 2008/152415 | 12/2008 |

OTHER PUBLICATIONS

"Push-Through Glove System"; Central Research Laboratories; at least as of Jun. 11, 2013.

(Continued)

*Primary Examiner* — Daniel Rohrhoff
(74) *Attorney, Agent, or Firm* — Dority & Manning, P.A.

(57) ABSTRACT

A breech lock for a glove box is provided that may be used to transfer one or more items into the glove box. The breech lock can be interchangeably installed in place of a plug, glove, or other device in a port or opening of a glove box. Features are provided to aid the removal of items from the breech lock by a gloved operator. The breech lock can be reused or, if needed, can be replaced with a plug, glove, or other device at the port or opening of the glove box.

14 Claims, 7 Drawing Sheets

(56) References Cited

U.S. PATENT DOCUMENTS

| | | |
|---|---|---|
| 2005/0269916 A1 | 12/2005 | Oyama et al. |
| 2006/0269637 A1* | 11/2006 | Romer et al. ................... 425/78 |
| 2008/0079363 A1* | 4/2008 | Yoshinaga et al. ............ 313/581 |
| 2010/0044372 A1* | 2/2010 | Kournikakis et al. .......... 220/9.2 |
| 2010/0186191 A1* | 7/2010 | Mares et al. ..................... 16/2.1 |
| 2012/0219388 A1* | 8/2012 | Armau ......................... 414/217 |
| 2012/0235548 A1 | 9/2012 | Cordes et al. |
| 2013/0061697 A1 | 3/2013 | Roberts |
| 2014/0163326 A1* | 6/2014 | Forsell .......................... 600/207 |

OTHER PUBLICATIONS

"Push-Through Glove System—Operating Principle"; Central Research Laboratories; at least as of Jun. 11, 2013.

\* cited by examiner

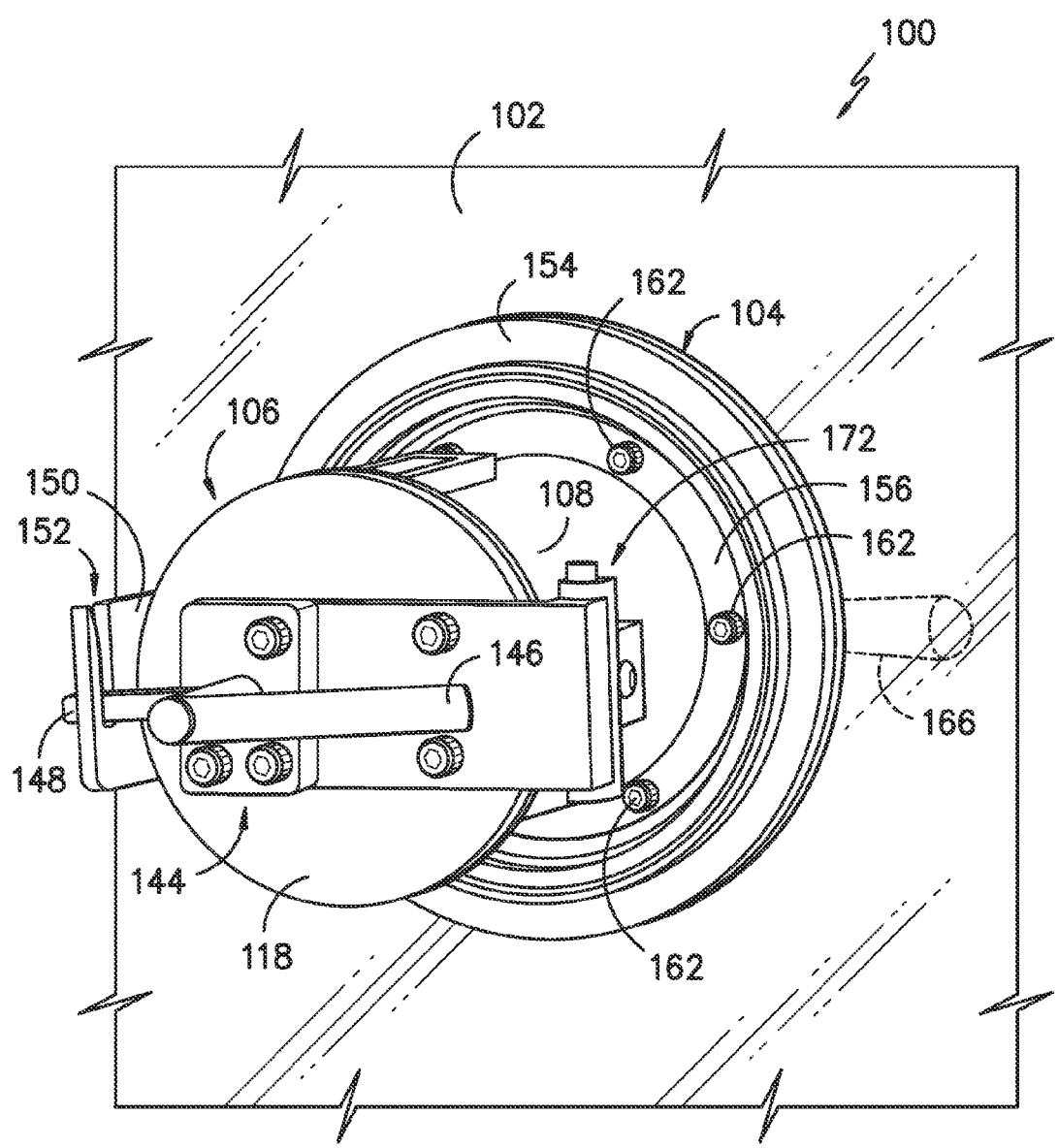
FIG. —1—

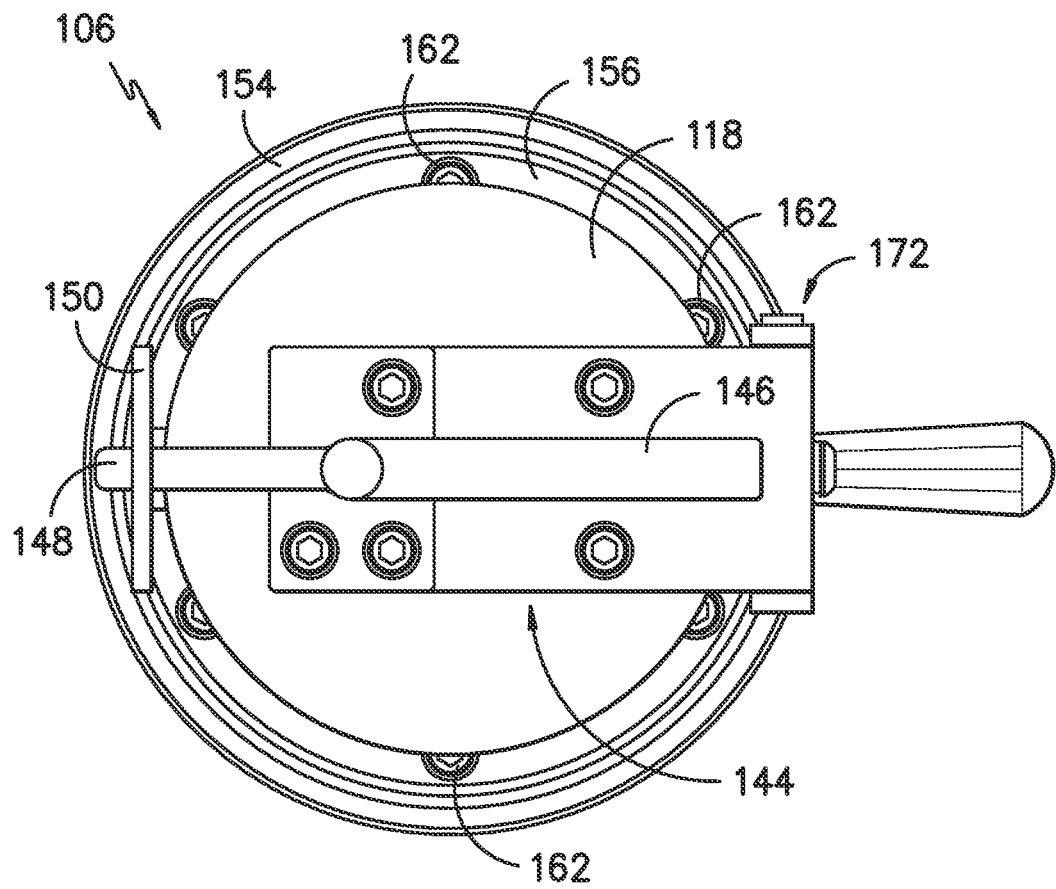
FIG. -2-

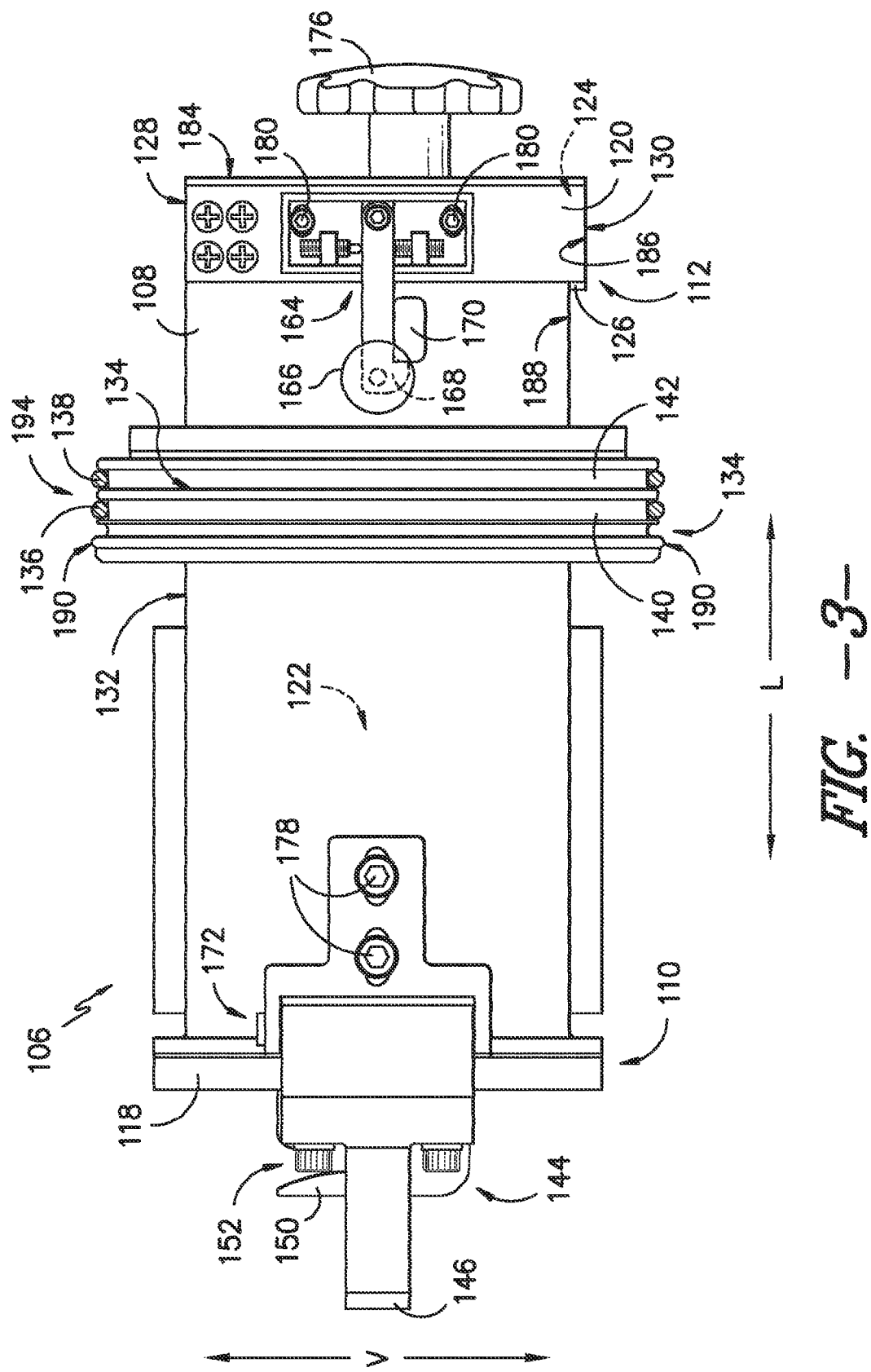
FIG. -3-

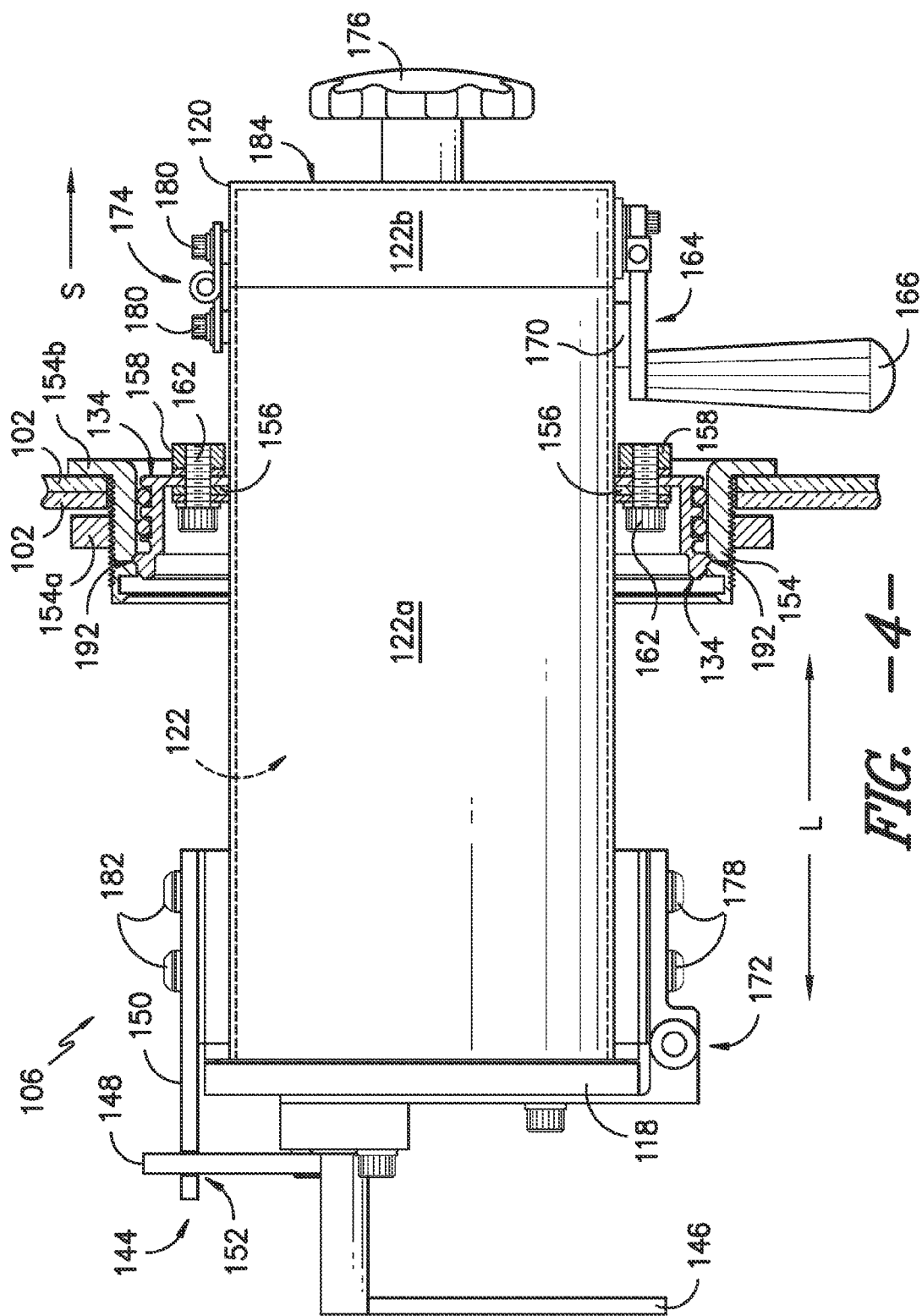
FIG. -4-

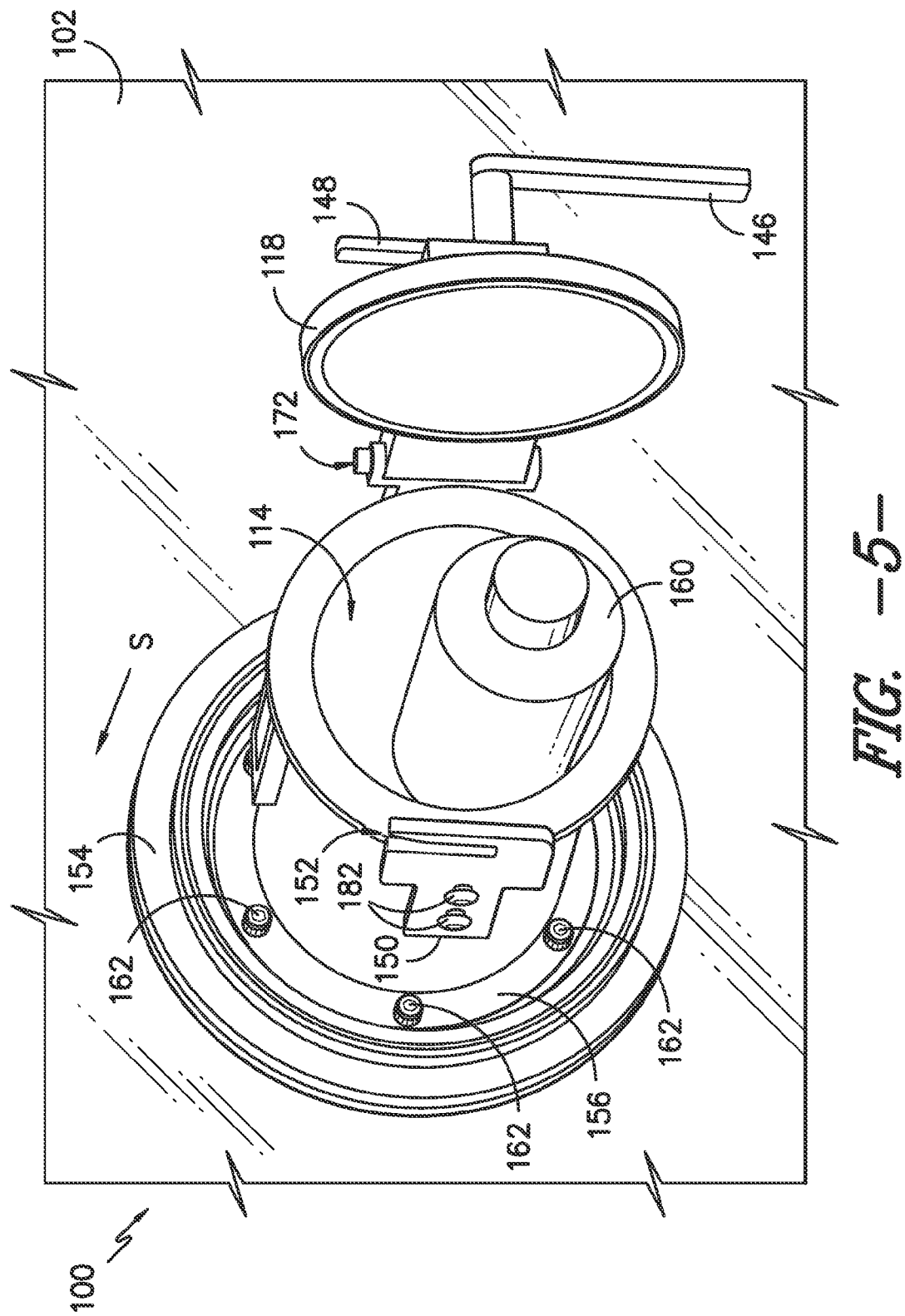
FIG. -5-

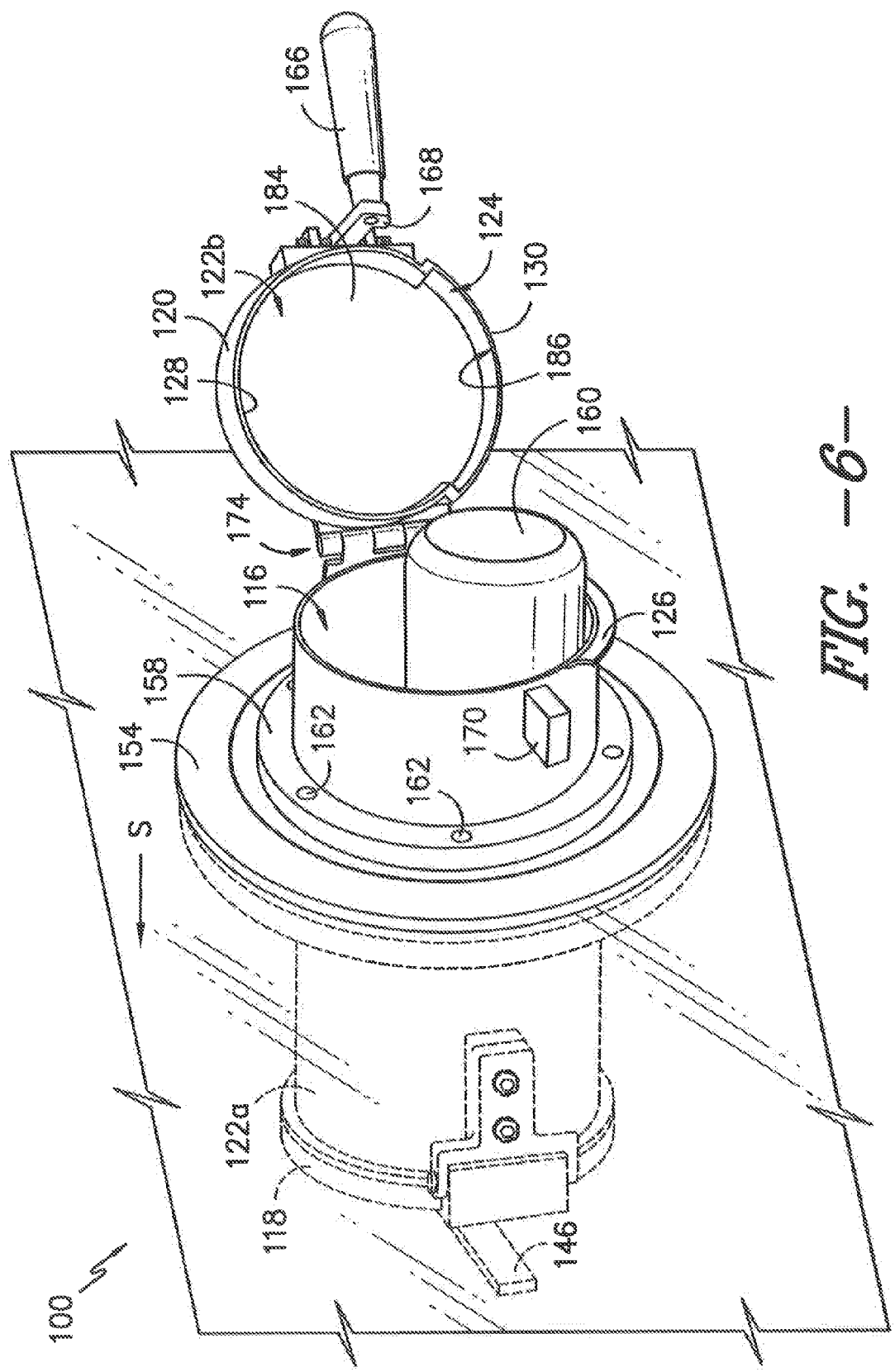
FIG. -6-

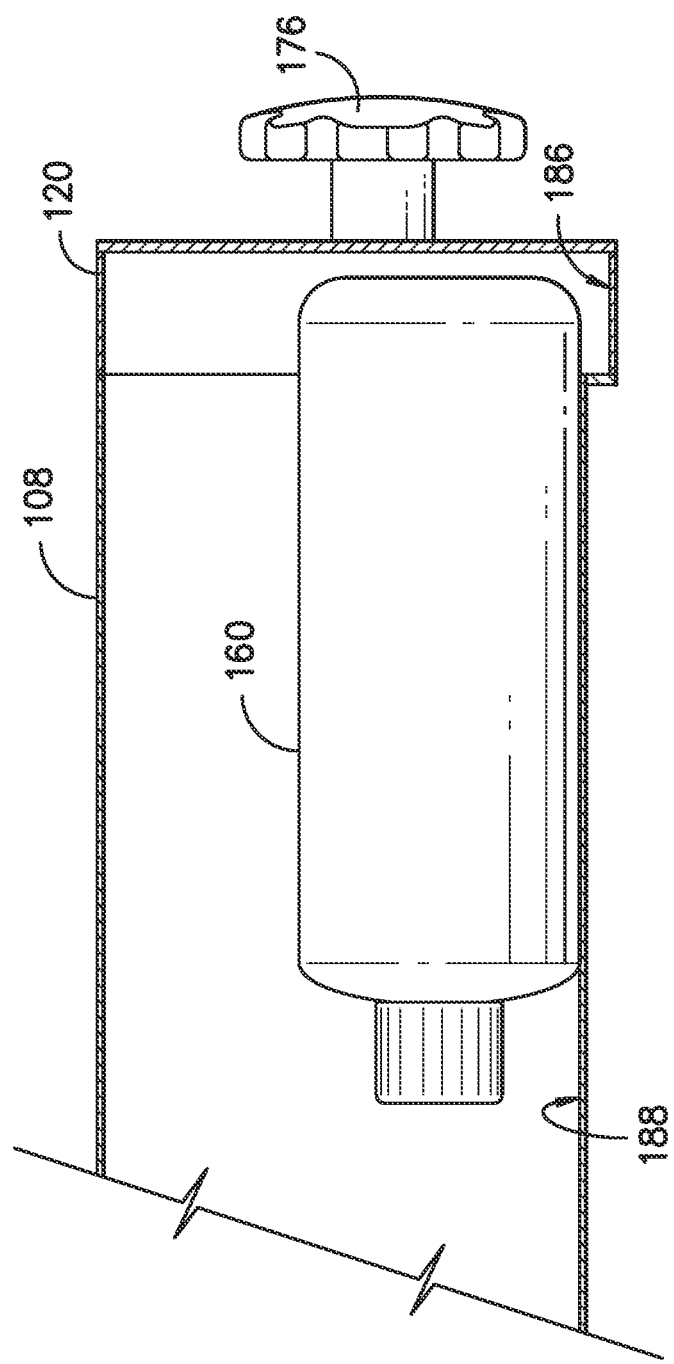
FIG. -7-

INTERCHANGEABLE BREECH LOCK FOR GLOVE BOXES

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The subject matter of the present disclosure relates generally to a breech lock for glove boxes and, more particularly, to an interchangeable breech lock for glove boxes.

BACKGROUND OF THE INVENTION

Glove boxes are commonly used for the manipulation of hazardous or potentially hazardous substances within a controlled environment. Typically the glove box will include one or more glass walls or windows through which an operator can view the interior of the glove box from a safe position exterior to the glove box. One or more pairs of glove ports or gloved openings are provided with gloves attached thereto. The gloves are connected to the wall of the glove box in a manner than maintains a seal between the interior and exterior of the glove box.

Operators can insert their hands (and typically a portion of their arms) through the gloved openings and into the gloves to manipulate items within the glove box. The interior of the glove box may be under a vacuum or may otherwise be maintained under a separate atmosphere than the exterior. After manipulating items within the glove box, operators can withdraw their hands. The glove box may include multiple pairs of gloved openings in side-by-side fashion along the glove box (i.e. a glove box line) so that e.g., multiple items can be manipulated or multiple operations can be performed in a manner similar to an assembly line.

As hazardous substances (e.g., toxic or radioactive) are typically within the glove box, it is important not to allow air or other gases interior to the glove box to escape to the exterior and to otherwise keep such hazardous substances within the glove box. However, challenges can exist with effectively utilizing a glove box while maintaining a proper seal or boundary between the interior of the glove box and the exterior where the operator(s) is located. For example, it may be desirable to transfer an item such as e.g., a tool, material, sample, etc. into the glove box for use therein. Care must be taken not to allow contamination of the exterior to the glove box by such an action.

One approach to transferring an item into a glove box has been to place the item into one of the gloves on the exterior side of the glove where the operator's hand would typically be placed. This first glove containing the item is then replaced by inserting a new glove into its place in a manner that maintains a seal between the interior and exterior of the glove box. The first glove, containing the item, is pushed into the interior of the glove box as the second glove takes it place. Once the first glove is completely displaced from the wall of the glove box, the operator's hands can be inserted into the pair of gloves to reach into the glove box and remove the item from within the first glove.

Unfortunately, such process of displacing a glove to insert an item into the glove box has certain deficiencies. If multiple items are introduced, depending on their size, multiple gloves may be expended as each is dropped into the glove box with the introduction of another item. Additionally, the shape, weight, or other aspects of the item may interfere with its positioning within a glove. Depending on the position of the gloved openings, the item and glove may be dropped within the glove box—which could be dangerous and/or damaging for some items. Once in the glove box, further manipulation is required in that the item must be removed from the glove by an operator now trying to handle the item while wearing gloves and reaching into the glove box. Other difficulties may also be encountered.

Accordingly, a device and method of transferring one or more items into a glove box would be useful. Such a device and method that can maintain a seal between the interior and exterior as the item is introduced would be particularly beneficial. The ability to use the gloved openings of an existing glove box interchangeably with such device and method would also be useful.

BRIEF DESCRIPTION OF THE INVENTION

The present invention provides a breech lock for a glove box that may be used to transfer one or more items into the glove box. The breech lock can be interchangeably installed in place of a plug, glove, or other device in a port or opening of a glove box. Features are provided to aid the removal of items from the breech lock by a gloved operator. The breech lock can be reused or, if needed, can be replaced with a plug, glove, or other device at the port or opening of the glove box. Additional aspects and advantages of the invention will be set forth in part in the following description, or may be apparent from the description, or may be learned through practice of the invention.

In one exemplary embodiment, the present invention provides an interchangeable breech lock for a glove box. The breech lock includes a housing extending between a first end and a second end, the first end having a first port, the second end having a second port. A plug is connected with the exterior of the housing. The plug is configured for removably securing the housing within a glove box opening. A first door is positioned at the first end of the housing and is configured for selectively opening or closing the first port. A second door is positioned at the second end of the housing and is configured for selectively opening or closing the second port. The housing and the second door collectively define a chamber when the second door closes the second port. The chamber has a first portion defined by the housing and a second portion defined by the second door. The chamber configured for receipt of an item for glove box transfer.

In still another exemplary embodiment, a breech lock for a glove box is provided that includes a housing providing a first portion of a chamber. The housing defines a longitudinal direction and a vertical direction. The housing defines a first port at a first end and a second port at a second end. A first door is attached to the housing near the first port and is configured for opening and closing the first port. A second door is attached to the housing near the second port and is configured for opening and closing the second port. The second door defines a second portion of the chamber when closing the second port. The second door defines a recess that is positioned vertically lower than the first portion of the chamber. An attachment mechanism is included for releasably securing the breech lock into a glove box opening of the glove box.

In another exemplary aspect of the present invention, a method for using a breech lock with a glove box is provided. The method includes the steps of inserting the breech lock into a glove box opening defined by the glove box; opening a first door on the breech lock and inserting an item into the breech lock; closing the first door on the breech lock; opening a second door and removing the item from the breech lock; closing the second door; and sliding the breech lock completely through the glove box opening while positioning another device into the glove box opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an exemplary embodiment of an interchangeable breech lock installed in a window of a glove box.

FIG. 2 illustrates a front view of the exemplary breech lock of FIG. 1.

FIG. 3 is a side view of the exemplary breech lock of FIG. 1.

FIG. 4 provides a top view of the exemplary breech lock of FIG. 1 as installed in a window of a glove box.

FIG. 5 provides a perspective view of the exemplary embodiment of FIG. 1 with an exterior or first door open and an item received into the breech lock. The view is from an exterior of the glove box.

FIG. 6 provides a perspective view of the exemplary embodiment of FIG. 1 with an interior or second door open for transfer of an item from the breech lock. The view is from an interior of the glove box.

FIG. 7 provides a schematic representation of an item at one end of a chamber of the exemplary breech lock of FIG. 1.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1, 2, and 3 provide perspective, front, and side views, respectively, of an exemplary embodiment of a breech lock 106 of the present invention. FIG. 1 shows breech lock 106 installed within a port or opening 104 formed by an enclosure ring 154 mounted on a glass window 102 of a glove box 100 as viewed from the exterior of glove box 100. Breech lock 106 can be installed in place of a glove, plug, or other device installed in opening 104. Also, breech lock 106 is interchangeable in that it can be replaced by a glove, plug, other device when needed as will be further described below.

Breech lock 106 includes a housing 108 extending along longitudinal direction L between a first end 110 and a second end 112. When installed, first end 110 is positioned exterior of glove box 100 and second end 112 is positioned in the interior of glove box 100 (as shown in FIGS. 1, 4, 5, and 6). For this exemplary embodiment, housing 108 is constructed as a cylinder having a first port 114 (FIG. 5) at first end 110 and a second port 116 (FIG. 6) at second end 112. Housing 108 may be constructed from e.g., stainless steel, aluminum, or other materials that may be chosen depending upon the type of hazardous materials with which it may be used.

As shown in FIGS. 1, 2, 3, 4, and 5, a first door 118 is positioned at first end 110 and is configured for allowing an operator to selectively open or close first port 114. First door 118 pivots or rotates on hinge 172 (attached to housing 108 with fasteners 178) between an open position (FIG. 5) and a closed position (FIGS. 1, 2, 3, 4, and 6). First door 118 can be secured into the closed position using a first door latch mechanism 144. More particularly, a handle 146 allows the operator to rotate a latch 148 out of a slot 152 provided by arm 150 (attached to housing 108 with fasteners 182) in order to unlock and open first door 118.

Referring to FIGS. 3, 4, and 6, a second door 120 is positioned at second end 112 and is configured for allowing an operator to selectively open or close second port 116. Such operation would likely be done by an operator reaching into the interior of glove box 100 through a gloved opening similar to opening 104 in glass window 102. Second door 120 pivots or rotates on hinge 174 (attached to housing 108 with fasteners 180) between an open position (FIG. 6) and a closed position (FIGS. 1, 3, and 4). Second door 120 can be secured into the closed position using a second door latch mechanism 164. More particularly, a handle 166 allows the operator to lift a latch 168 (FIG. 3) away from an arm 170 protruding from housing 108 in order to unlock and open second door 120. A knob 176 on second door 120 provides a convenient, additional means by which an operator can manipulate second door 120 from the interior of glove box 100.

The construction of hinges 172 and 174 and their attachment to housing 108 is not limited to the constructions shown in the figures. Other constructions having different configurations and/or methods of attachment or support from housing 108 may be used as well.

As shown in FIG. 4, when second door 120 is closed, housing 108 and second door 120 collectively form a chamber 122 having two portions. A first portion 122a is provided by chamber 122 while a second portion 122b is provided by second door 120. Chamber 122 is configured for receipt of one or more items, such as e.g., item 160 (FIGS. 5 and 6), for transfer into glove box 100.

Continuing with FIGS. 3, 4, and 6, second door 120 has a main wall 184 that is substantially orthogonal to longitudinal axis L. Together, a peripheral wall 128 and an offset wall 130 extend around the periphery of main wall 184 to define second portion 122b of chamber 122. Offset wall 130 also extends below housing 108 (FIG. 3) so that second portion 122b of chamber 122 includes a recess 124 that is positioned lower along the vertical direction V than first portion 122a. More particularly, as also shown in FIG. 7, offset wall 130 defines an offset wall interior surface 186 that is positioned vertically lower than chamber interior surface 188.

Housing 108 includes a stop 126 that is located adjacent to second port 116. Stop 126 is positioned for alignment with recess 124 so as to close off recess 124 when second door 120 is in a position closing off second port 116. The precise shape and configuration of recess 124 formed by offset wall 130 is not limited to that shown in the figures and others may be used.

First door 118 and second door 120 may be constructed from a variety of different materials such as e.g., stainless steel, aluminum, and others. In one exemplary embodiment of the invention, first door 118 is constructed from aluminum so as to minimize the cantilevered effect on the glass window particularly when first door 118 is in an open position.

As shown in FIGS. 3 and 4, breech lock 106 includes an attachment mechanism 194 for releasably securing the housing 108 within glove box opening 104 of glove box 100. More particularly, housing 108 includes a flange 156 (FIG. 4) connected to the exterior 132 of housing 108. Flange 156 may e.g., welded to exterior 132 or formed integrally therewith. Flange 156 connects a plug 134 with the exterior 132 of housing 108. A series of fasteners 162 are circumferentially spaced about flange 156 (FIG. 1) and threaded into flange ring 158 so as to sandwich or press plug 134 therebetween.

Plug 134 defines one or more grooves 140 and 142 into which one or more O-ring seals 136 and 138 are received. Plug 134 also defines a lip 190 that is received into a groove 192 formed by enclosure ring 154. Enclosure ring 154 includes an exterior portion 154a and an interior portion 154b that are used to sandwich glass window 102 (which may be one or more layers of glass 102).

The construction of plug 134 and enclosure ring 154 is provided by way of example. Plugs and/or rings with constructions different than what is shown in the figures may be used with the present invention as well while still providing a breech lock that is interchangeable and that seals glove box 100.

Accordingly, during installation of breech lock 106, plug 134 is removably received into the opening 104 formed by enclosure ring 154 in a compression fit that is sealed by O-rings 136 and 138. In addition, this compression fit allows plug 134, along with breech lock 106, to be pushed into the interior of glove box 100 by sliding along the direction indicated by arrow S in FIGS. 4, 5, and 6. One or more specially equipped tools may be used to force the movement of plug 134 (and, therefore, breech lock 106) along the direction of arrow S.

An exemplary method of using breech lock 106 for a glove box transfer will now be described. As previously indicated, an operator may desire to introduce an item 160 into glove box 100. In fact, glove box 100 may include multiple gloved ports along window 102 in what is sometimes referred to as a glove box line. The operator may desire to introduce the item 160 (tool, sample, material, etc.)—shown by way of example in FIGS. 5 and 6 as a container—at a particular location along the glove box line.

Rather than placing item 160 into a first glove and displacing it with a second glove into the glove box 100 as previously described, the operator can insert breech lock 106 into the desired opening 104. This insertion may replace an existing glove or plug already installed in opening 104 in a manner similar to replacing a first glove with a second glove as previously described. Unless item 160 is already in chamber 122, the operator can open first door 118 and place item 160 into chamber 122 of breech lock 106. The operator can push item 160 completely against second door 120 so that item 160 is at least partially within second portion 122b of chamber 122. In order to help prevent the release of hazardous substances from glove box 100, the operator closes first door 118 so as to close first port 114. First door 118 can be locked using first door latch mechanism 144.

Next, by reaching through e.g., an adjacent glove opening (not shown) in the glove line, the operator can reach into the interior of glove box 100 and open the second door 120 of breech lock 106 by lifting handle 166 to unlock second door latch mechanism 164 and reveal second port 116. As shown schematically in FIG. 7, because of recess 124 defined by offset wall 130, container 160 does not rest on the offset wall interior surface 186 and, instead, rests on chamber interior surface 188. Therefore, as second door 120 is opened, item 160 projects from second port 116 as shown by FIG. 6 but is not inadvertently moved, which might accidentally cause item 160 to drop into glove box 100. In addition, because of the second portion 122b provided by chamber 122, placement of the item 160 against second door 120 now allows item 160 to project from second port 116 in a manner that is more conducive to grasping by a gloved operator from the interior of glove box 100. Once item 160 is removed, second door 120 can be closed.

Under certain circumstances, the operator can continue to use breech lock 106 in the manner described to introduce additional items into glove box 100. For example, a vacuum may be maintained within the interior of glove box 100 so that opening second door 120 does not introduce contaminants into chamber 122. In addition, should the operator desire to reuse opening 104 for another purpose such as a gloved opening, the operator can slide breech lock 106 through opening 104 while replacing it with another device (such as a glove attached to plug with seals) and maintaining the integrity of the sealed glove box 100.

The above described method for using breech lock 106 is provided by way of example only. Using the teachings disclosed herein, one of skill in the art will understand that other methods may be applied for use of a breech lock of the present invention as well. Additionally, latch mechanisms 144 and 164 are provided by way of example—other mechanisms may be used for securing doors 118 and 120. Seals may also be provided with doors 118 and 120 and/or their respective ports 114 and 116.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An interchangeable breech lock for a glove box, comprising:
   a housing extending between a first end and a second end, the first end having a first port the second end having a second port;
   a plug connected with the exterior of the housing, the plug configured for removably securing the housing within a glove box opening;
   a first door positioned at the first end of the housing and configured for selectively opening or closing the first port; and
   a second door positioned at the second end of the housing and configured for selectively opening or closing the second port;
   wherein the housing and the second door collectively define a chamber when the second door closes the second port, the chamber comprising
      a first portion defined by the housing; and
      a second portion defined by the second door and having a recess that is positioned lower along a vertical direction than the first portion, wherein the chamber is configured for receipt of an item for glove box transfer.

2. An interchangeable breech lock for a glove box as in claim 1, wherein the second. door comprises:
   a peripheral wall extending peripherally around the second door; and
   an offset wail connected to the peripheral wall and offset therefrom, the offset wall defining the recess of the second portion of the chamber.

3. An interchangeable breech lock for a glove box as in claim 2, wherein the housing further comprises a stop located adjacent to the second port and positioned for alignment with the offset wall so as to close off the recess when the second door closes the second port.

4. An interchangeable breech lock for a glove box as in claim 1, further comprising a flange connected to the housing and attached to the plug.

5. An interchangeable breech lock for a glove box as in claim 1, wherein the plug further comprises one or more seals for sealing off the glove box opening when the breech lock is installed therein.

6. An interchangeable breech lock for a glove box as in claim 1, further comprising a first door latch mechanism attached to the first door and configured for selectively latching the first door into a closed position over the first port.

7. An interchangeable breech lock for a glove box as in claim 1, further comprising a second door latch mechanism attached to the second door and configured for selectively latching the second door into a closed positioned over the second port.

8. An interchangeable breech lock for a glove box as in claim 1, further comprising an enclosure ring for positioning around the glove box opening, the enclosure ring attached to the glove box, wherein the plug is removably received within the enclosure ring.

9. An interchangeable breech lock for a glove box as in claim 1, wherein the housing comprises a cylinder extending along a longitudinal direction between the first port and the second port.

10. A breech lock for a glove box, comprising:
    a housing providing a first portion of a chamber, the housing defining a longitudinal direction and a vertical direction, the housing defining a first port at a first end and a second port at a second end;
    a first door attached to the housing near the first port and configured for opening and closing the first port;
    a second door attached to the housing near the second port and configured for opening and closing the second port, the second door defining a second portion of the chamber when closing the second port, the second door defining a recess that is positioned vertically lower than the first portion of the chamber; and
    an attachment mechanism for releasably securing the breech lock into a glove box. opening of the glove box.

11. A breech lock for a glove box as in claim 10, wherein the second door comprises:
    a peripheral wail extending peripherally around the second door; and
    an offset wall connected to the peripheral wall and offset therefrom, the offset wall defining the recess of the second portion of the chamber.

12. A breech lock for a glove box as in claim 11, wherein the housing further comprises a stop located adjacent to the second port and positioned for alignment with the offset wall so as to close off the recess when the second door closes the second port.

13. A breech lock for a glove box as in claim 10, wherein the attachment mechanism comprises a flange connected to the housing.

14. A breech lock for a glove box as in claim 10, wherein the attachment mechanism comprises a plug connected with the exterior of the housing, the plug configured for removably securing the housing within a glove box opening.

* * * * *